Figure 1:
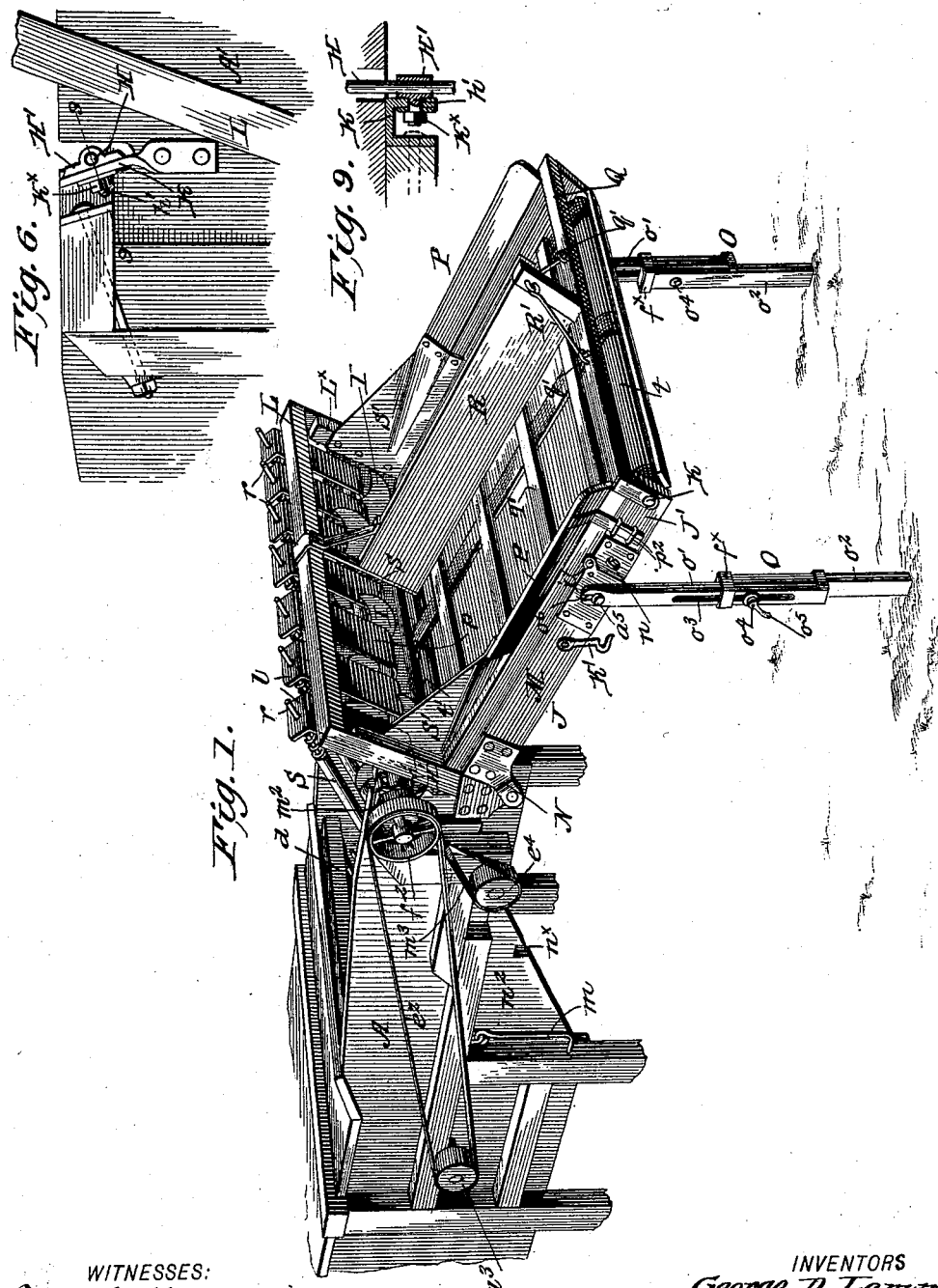

(No Model.) 4 Sheets—Sheet 1.

G. D. LAMM & W. SICARD.
BAND CUTTER AND FEEDER.

No. 517,754. Patented Apr. 3, 1894.

WITNESSES:
Fred G. Dieterich
M. D. Blondel

INVENTORS
George D. Lamm
William Sicard
BY Munn & Co
ATTORNEYS.

(No Model.) 4 Sheets—Sheet 4.

G. D. LAMM & W. SICARD.
BAND CUTTER AND FEEDER.

No. 517,754. Patented Apr. 3, 1894.

WITNESSES:
Fred G. Dieterich
M. D. Blondel

INVENTORS
George D. Lamm.
William Sicard.
BY Munn & Co.
ATTORNEYS.

United States Patent Office.

GEORGE D. LAMM AND WILLIAM SICARD, OF ACKLEY, IOWA.

BAND-CUTTER AND FEEDER.

SPECIFICATION forming part of Letters Patent No. 517,754, dated April 3, 1894.

Application filed January 26, 1893. Serial No. 459,922. (No model.)

*To all whom it may concern:*

Be it known that we, GEORGE D. LAMM and WILLIAM SICARD, residing at Ackley, in the county of Hardin and State of Iowa, have invented a new and useful Improvement in Band-Cutters and Feeders, of which the following is a specification.

Our invention relates to band cutters and feeders for thrashing machines, and it has primarily for its object to provide simple, easily adjusted and comparatively inexpensive cutting and feeding devices, which are adapted for connection with the ordinary separating or thrashing machine frames, and which will effectively serve for their intended purposes.

It has also for its object to provide a cutter and feeder mechanism having a conveyer frame formed in sections adapted to be folded up and under the front end of the thrasher frame proper in a compact form, for transportation from place to place, without detaching such devices from the thrasher frame.

A further object is to provide a cutting means, in which the blades are so arranged as to have one or more of them passing through the sheaves at all times during the operation of the machine, and in connection therewith to provide suitably arranged shields or protectors for such blades, whereby to prevent injury thereto, and the grain from being carried over the cutter shaft.

Another object is to provide a system of drive belting for the several parts, which will require no change in their arrangement, when such parts are folded up for transportation.

With other minor objects in view, which will hereinafter appear, the invention consists in such peculiar arrangement and combination of parts, as will be first described in detail and then specifically pointed out in the claims, reference being had to the accompanying drawings, in which—

Figure 2:
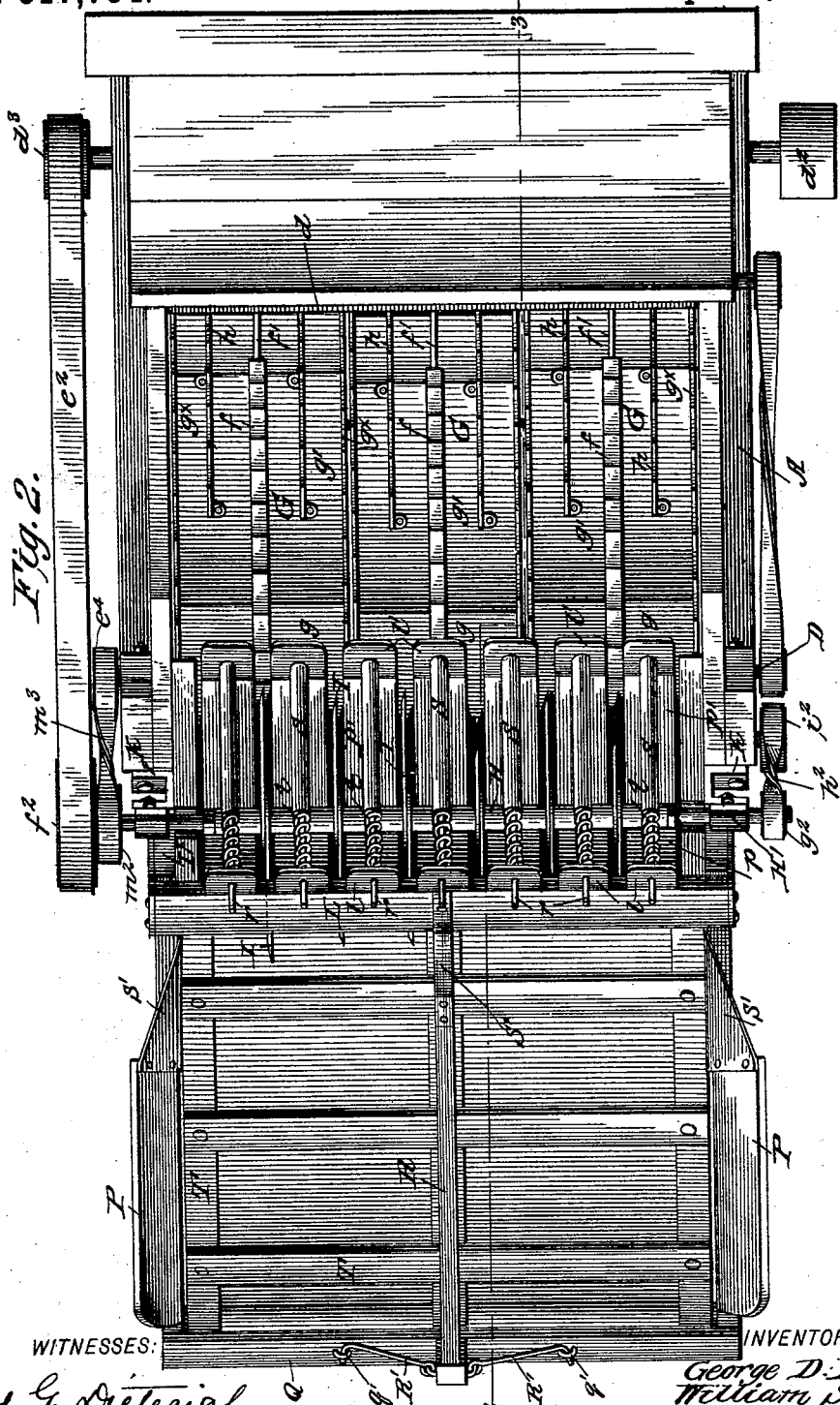
Figure 3:
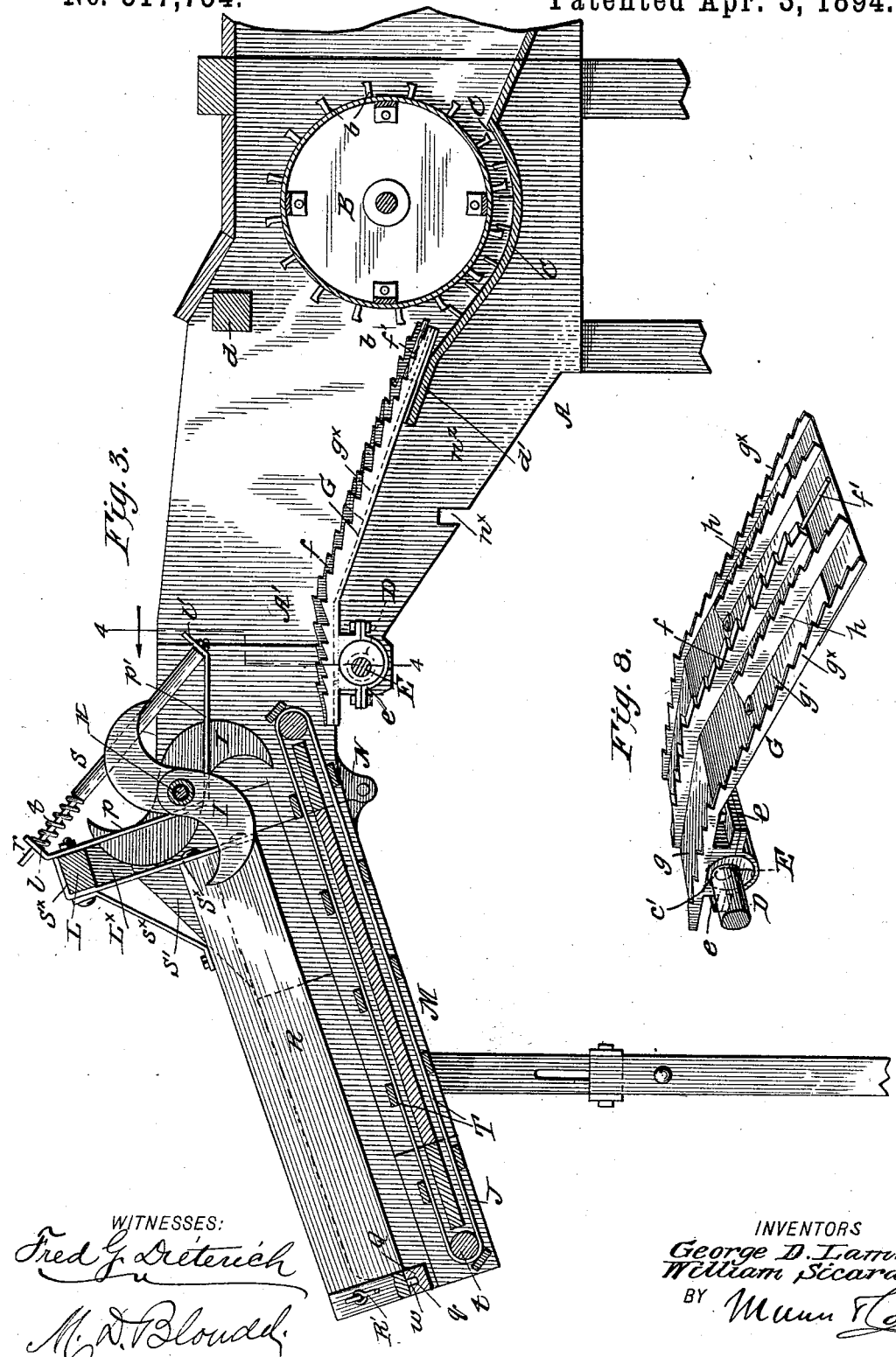
Figure 4:
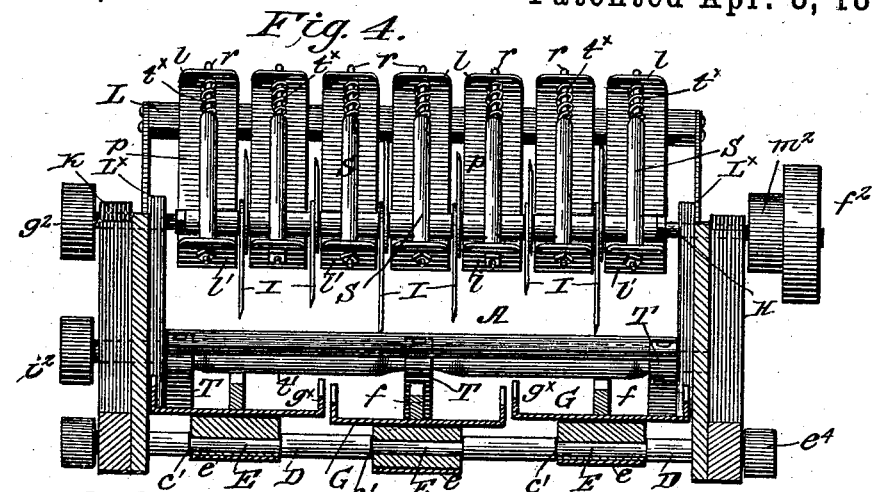
Figure 5:
Figure 7:
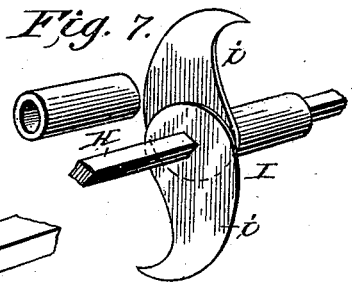
Figure 10:
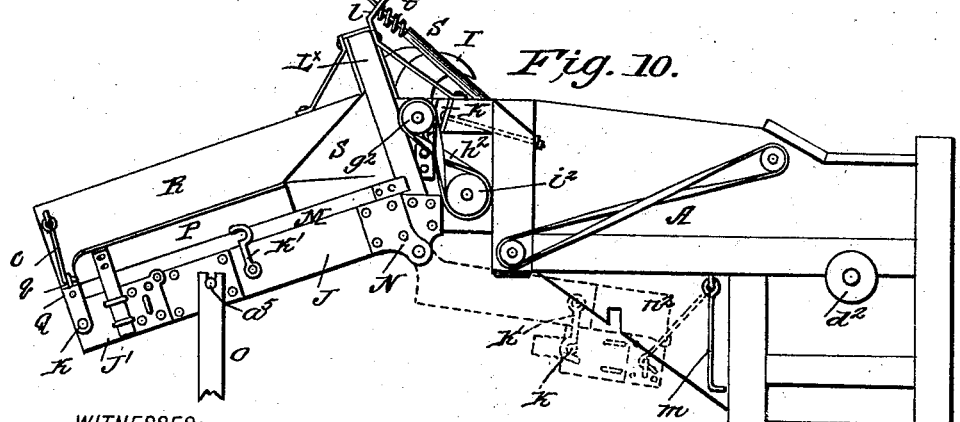

Figure 1 is a perspective view of the rear end of a thrasher frame with our improved devices connected therewith. Fig. 2 is a top plan view of the same. Fig. 3 is a vertical longitudinal section taken on the line 3—3 Fig. 2. Fig. 4 is a transverse section on the line 4—4 Fig. 2. Fig. 5 is a perspective view of the central or division board, detached. Fig. 6 is a detail view illustrating one of the adjustable bearings for the cutter shaft hereafter referred to. Fig. 7 is a detail view of a pair of the cutter blades and their connection with the cutter shaft. Fig. 8 is a detail perspective view of one of the rocking or agitator rakes. Fig. 9 is a cross section taken on the line 9—9 Fig. 6, and Fig. 10 is a detail side view showing the conveyer frame folded back in dotted lines.

Referring to the accompanying drawings A indicates the thrasher frame, in the front end of which are located the cylinder B and the concave C, all of which are of the usual or any desired construction, and at the front of such cylinder above the line of its teeth *b* is disposed a rotary beater *d* which rotates in the same direction as the cylinder, and serves to beat back the straw or grain which might otherwise work up over the said cylinder and clog the latter during the operation of the machine.

The front end of the thrasher frame A has a forwardly extending portion A′ which may be made an integral part thereof as shown, or in practice may be detachably connected therewith, the front end of such portion A terminating in a throat or receiving end as shown clearly in Fig. 3. By reference to such figure and Fig. 4, it will be noticed at the lower front end of such throat is journaled a shaft D, which carries a series of eccentrics E having side flanges *c′* which form guides for the agitator rake sections G, presently referred to, such eccentrics being arranged in different radial alignments about the shaft, so as to impart intermittent forward and backward movements to the rakes during the rotation of the said shaft. The rakes G, one of which is shown in detail in Fig. 8, consist each of a base board formed with a rear horizontal portion *g* and a forward downwardly inclined portion *g′*, such rear portions having divided journal boxes *e* which embrace the eccentrics E, while the forward portions rest loosely on the front extension *d′* of the concave C, the said boxes *e* fitting between the flanges *c′ c′* before referred to to hold the several rakes from moving laterally on such shaft and insure a non interference between such boards as they pass each other in their reverse movements. Each rake board carries a central rake or toothed rib *f*, which extends the full length thereof, a narrower rake member $g$ at each edge and intermediate short rakes $h$, which and the rake members $g'$ project forwardly from such bottom board, projecting fingers $f'$ also extending forward from the central rakes $f$.

Referring now more particularly to Fig. 3 it will be noticed that the front ends of the rake members $g'$ $h$ and the finger $f'$ extend forward to a point under the front end of cylinder B, and in the path of the teeth $b$, when the rakes proper are vibrated to their forward movement, so that they will intermesh with such cylinder teeth, and thereby feed the grain directly to the cylinder and insure a more uniform and even feed of the same.

In the upper end of the extension $A'$ in advance of shaft D is disposed the cutter shaft H which is held for vertical adjustment, relatively to the feed carrier or elevator presently referred to, it being journaled in boxes $H'$ having shank portions $h'$ held in slotted brackets K secured to the side frame $A'$ as clearly illustrated in Figs. 6 and 10 of the drawings, such shanks $h'$ being threaded to receive a securing nut $K^\times$, by means of which the cutter shaft can be held to its adjusted positions.

I indicates the cutters which consist of pairs of blades $i$, the members of each pair being projected in diametrically opposite directions each being somewhat crescent shaped in outline and disposed relatively to the other that the cutter proper, is received as shown most clearly in Fig. 3. The object in forming the cutters each of a pair of blades, projected in opposite directions and placed on the shaft singly as shown, is to reduce the expense of replacing them in case of breakage, to the minimum. Further by securing each blade on the shaft and lapping each pair as shown, the oppositely projecting blade members in each cutter will travel in different paths and thus materially spread the grain laterally and assist in its passage under the cutter shaft.

To prevent the grain passing over the cutter shaft and also to provide, as it were, yielding pressure means whereby the grain is prevented from wrapping about the blades, especially when wet, and whereby such grain will be the more uniformly held to pass under the cutters, we employ in connection with cutter mechanism protecting shield devices, the construction of which is most clearly shown in Figs. 1 and 3—by reference to which it will be seen such devices consist of a series of angle plates $p$, secured at their upper ends to a cross bar L, such ends being bent back to form apertured guides $l$, while their lower portions extend down in front of the cutter shaft, and terminate in horizontal portions $p'$ which extend under the said shaft and into the throat of the machine and end in apertured guides $l'$ as shown. These shields which are arranged between the cutters as shown most clearly in Fig. 1, have supported in their apertured ends $l$ $l'$ rods $r$ $r$, which are secured at their lower ends in any desired manner to the lower guides $l'$, and are held for free longitudinal movement in the upper guides $l$. A tension spring $t$ is disposed about each of the rods $r$, between the upper guide $l$ and a stop, which as shown is in the nature of tubes S, held about the lower end of such rods.

By providing shield devices constructed in the manner described, such devices not only serve to prevent the grain from passing up over the cutter shaft, and as a means for cleaning the cutters, but also serve to form simple yielding pressing members which serve to press the grain and hold it in a more compact and uniform manner to be engaged by the cutters.

M indicates the conveyer frame, which is connected to the front of the extension $A'$ by a hinge joint N, its outer end being supported upon detachable and vertically adjustable legs O, which are formed in two parts $o'$ $o^2$, the former having a slot $o^3$, through which passes a threaded bolt $o^4$ secured to part $o'$ and which has on its threaded end an adjusting or wing nut $o^5$, by the adjustment of which the two sections or parts of the legs O may be readily held together.

$f^\times$ indicates a loop member secured on the upper end of the lower leg section which embraces the upper section and forms a convenient guide therefor, and the said upper leg sections have a notch $o^6$ which fits over headed bolts $a^5$ secured to the side beams of the conveyer frame. These side beams, it will be noticed by reference to Fig. 1 are formed in two sections J J' which are hinged together at $i^\times$ in such a manner that the outer section J' can be folded in on top of the inner section J, such outer sections also having lateral studs K with which hooks K' on the inner section engage when the parts are folded together, as indicated in dotted lines in Fig. 10, from which it will be seen that while the outer section is held to its folded position on the inner section J, both sections are held folded under the extension $A'$ of the thrasher frame, by means of hooks $m$ pivotally connected to such extensions, which engage with staples $n$ on the outer sections J'. Auxiliary side boards $n^2$ are secured to the extension $A'$ between which the conveyer frame fits and is carried when folded for transportation, said side boards $n^2$ preventing lateral movement of the conveyer frame and also forward or rearward movement during transportation, the latter being accomplished by forming recesses $n^\times$ in the edges of the auxiliary side boards, which receive the headed bolts $a^5$ before referred to.

P indicates the side boards of the conveyer frame, which are detachably held thereon by the standard irons $p^\times$ at the front end which are secured to such side boards and which fit staples $p^2$ in the side beams, and at their rear end by means of lap members S' which fit inside the vertical beams $L^\times$ projected up from the outer end of the extension $A'$. In practice the upper part of the side boards P are flared outward as shown. A transverse yoke or bail member Q is journaled on studs K, and when turned up to the position shown in Fig. 1 it forms a support for the front end of a removable center or dividing board R, which is provided to prevent the sheaves turning in the conveyer, while being carried to the band cutters, thus insuring the feeding forward of the grain head first. This board has at its front end a dowel pin $w$, which fits a recess $q$ in the member Q, and to hold such end from turning it is braced by the rods R′ R′ which engage staples $q'$ $q'$ on such cross member Q as most clearly shown in Fig. 2. When the conveyer frame is folded under as shown in dotted lines in Fig. 10 the bail member Q is turned down to the position indicated by dotted lines. At the upper end the board R has secured thereto a plate S braced by the member $s^x$, and terminating at its upper end in a hook member S which is adapted to snugly slip over the cross bar as clearly shown in Fig. 2 and thereby detachably support the upper end of the said board R.

T indicates an endless conveyer belt mounted on a roller $t$ journaled at the outer end of the side beam section J′ and a roller $t'$ journaled in the outer or feed end of the extension A′, at a point to the rear of the band cutter shaft, such endless belt passing around the flooring of the conveyer. On one end of the cylinder shaft is a main drive pulley $d^2$ driven in the usual manner, and on the opposite end is mounted a pulley $d^3$ which is connected by a belt $c^2$ with the large pulley $f^2$ mounted on one end of the cutter shaft, on which at the opposite end is located a pulley $g^2$ which connects by a crossed belt $h^2$ with a pulley $i^2$ on the inner conveyer belt roller $t'$ to impart motion thereto in the direction indicated by the arrow in Fig. 2. The cutter shaft also has a pulley $m^2$ which is connected by a crossed belt $m^3$ with a pulley $e^4$ on the eccentric shaft D.

From the foregoing description taken in connection with the drawings it will be observed that the grain as it is fed forward is compactly held to pass between the cutters whereby to render the action of the said cutters the more effective, and as it is separated it will be partially spread by the said cutting action, before it passes onto the rakes, which rakes owing to their peculiar relation, will intermittently move longitudinally in reverse direction and also rock vertically, and as their rake or toothed portions proper are held to pass between the teeth of the cylinder as it revolves, it follows, that the grain will be thereby thoroughly separated and fed uniformly and directly between such cylinder teeth. It will also be observed that owing to the novel arrangement of the several parts of the conveyer frame, the side boards, as also the center board can be readily removed when it is desired to fold the frame for transportation, and that the folding of the frame is accomplished without removal of the endless belt or any disarrangement of the driving belts, such arrangement rendering the readjustment of the parts to their operative position easy, and when in their folded position holding them in a compact manner and out of the way.

Having thus described our invention, what we claim, and desire to secure by Letters Patent, is—

1. In a band cutting and feeding mechanism substantially as described, the combination with the conveyer frame having a hinged bail like member at its front end adapted to be folded under such end, of a division board having a hook member at its upper end adapted to slip over a cross bar of the conveyer frame, and having its front end supported on the bail member, and means for securing it detachably to such bail member, all substantially as hereinbefore shown and described.

2. In a band cutting and feeding mechanism substantially as described, the combination with the conveyer formed of a main portion hinged to fold under the mouth or feed end of the thrasher frame, and a bail member hinged at the outer end of such main portion and a transverse frame member at the inner end, of a division board having detachable connections with the said transverse member at its upper end, and supported on and detachably connected with the bail member at its lower end, as and for the purposes described.

3. In a band cutter and feeder, the combination of the band cutter shaft, the knives or blades, and a yielding shield, consisting of bent plates rigidly secured to a cross beam of the frame near one end and passing under said shaft and between the said blades, rods secured to one end of said plates and passing loosely through the other one, tubes inclosing part of the length of said rods and coiled springs surrounding the uninclosed parts of said rods, substantially as described.

4. In a band cutter and feeder, the combination with the frame including a transverse support or bar, the conveyer, and a revolving cutter shaft having radially arranged blades, of spring metal angle plates, secured at their upper ends to the said cross bar, their front or vertical member extending down between the cutter blades in front of the cutter shaft, their horizontal portion being extended rearward under said shaft, and beyond the cutters, said plates being of a width to snugly fit between such blades, and means for imparting a downward pressure to the horizontal members of said plates, whereby the pressure members will serve to compactly press the grain against the discharge end of the said conveyer, all substantially as shown and described.

5. In a band cutting and feeding mechanism substantially as described, the combination with the cross bar L, the frame portion A′, and the rotary shaft H journaled in rear of the bar L, said shaft having a series of spaced radial blades, of the plates $p$ secured to the rear of the bar L, and extended down in front of the shaft H, said plates having horizontal portions $p'$ extended under and to the rear of such shaft, and spring actuated devices for normally holding the portions $p'$ pressed downward, all substantially as and for the purposes shown and described.

6. As an improvement in a band cutter and feeder mechanism for thrashing machines, the combination with the main frame having guide notches in its front extension, of a conveyer frame hinged to the front end to fold thereunder, said conveyer frame having lateral headed studs, and eyes or staples, the detachable legs having notched ends adapted to engage the lateral studs when the frame is extended, said studs adapted to engage the notches in the main frame, and hook members hinged to the main frame and adapted to engage the eyes in the sides of the conveyer frame, all arranged substantially in the manner shown and for the purposes described.

7. As an improvement in band cutters and feeders, the combination with the main frame, and the auxiliary side boards $n^2$ having recesses $n^\times$, of the conveyer frame hinged to the front end to fold thereunder and having lateral headed studs and eyes or staples, and the hook members hinged to the main frame adapted to engage the eyes or staples when the conveyer is folded between the boards $n^2$, all arranged substantially in the manner shown and described.

Witness our hands this 21st day of January, 1893.

GEORGE D. LAMM.
WILLIAM SICARD.

Witnesses:
DANIEL H. BONACKER,
JOHN J. HERBSTER.